United States Patent
Retter et al.

(10) Patent No.: US 10,569,350 B2
(45) Date of Patent: Feb. 25, 2020

(54) FIXING DEVICE, WIRE ERODING MACHINE OR LASER SYSTEM, AND WIRE ERODING OR LASING METHOD

(71) Applicant: RETERO GMBH, Feuerthalen (CH)

(72) Inventors: Helmut Retter, Diessenhofen (CH); Abdelmajid Saadellaoui, Schaffhausen (CH)

(73) Assignee: RETERO GMBH, Feuerthalen (CH)

(\*) Notice: Subject to any disclaimer, the term of this patent is extended or adjusted under 35 U.S.C. 154(b) by 413 days.

(21) Appl. No.: 15/403,210

(22) Filed: Jan. 11, 2017

(65) Prior Publication Data
US 2017/0197268 A1    Jul. 13, 2017

(30) Foreign Application Priority Data
Jan. 11, 2016    (GB) .................. 10 2016 100 374

(51) Int. Cl.
| | |
|---|---|
| *B23Q 3/02* | (2006.01) |
| *B23H 11/00* | (2006.01) |
| *B23Q 3/06* | (2006.01) |
| *B23H 7/26* | (2006.01) |
| *B25B 1/24* | (2006.01) |

(Continued)

(52) U.S. Cl.
CPC ............ *B23H 11/003* (2013.01); *B23H 1/00* (2013.01); *B23H 7/265* (2013.01); *B23K 26/702* (2015.10); *B23K 37/0443* (2013.01); *B25B 1/241* (2013.01); *B25B 5/10* (2013.01); *B25B 5/163* (2013.01); *B23H 7/02* (2013.01); *B23K 2101/20* (2018.08)

(58) Field of Classification Search
CPC ...................... B23Q 3/005–066; B23H 11/003
See application file for complete search history.

(56) References Cited

U.S. PATENT DOCUMENTS

| 4,211,103 A * | 7/1980 | Grimaldo ............... B21D 41/00 269/217 |
| 5,201,502 A * | 4/1993 | Schneider ............. B23Q 3/061 269/221 |

(Continued)

FOREIGN PATENT DOCUMENTS

| CN | 201702591 U | 1/2011 |
| CN | 103084886 | 5/2013 |

(Continued)

*Primary Examiner* — Michael A Laflame, Jr.
(74) *Attorney, Agent, or Firm* — Soroker Agmon Nordman

(57) ABSTRACT

A fixing device (1) for fixing workpieces, to fix substantially rod-shaped workpieces and workpieces to be machined by wire erosion or lasing, including a support apparatus (20) with a plurality of shaped elements (21) for accommodating and supporting a plurality of workpieces in the correspondingly formed shaped elements (21), and for positioning and fixing the workpieces in at least one translatory degree of freedom (22) in the shaped elements (21), wherein the fixing device (1) has a clamping apparatus (50) by means of which pressure force (52) can be applied to a plurality of workpieces accommodated in the shaped elements (21) so that the workpieces are fixed in the clamping apparatus (50) at least in a friction lock due to the applied pressure force, and wherein the support apparatus (20) as shaped elements (21) includes a plurality of passages (30) through which the workpieces can be guided.

9 Claims, 9 Drawing Sheets

Figures 1, 2, 3:
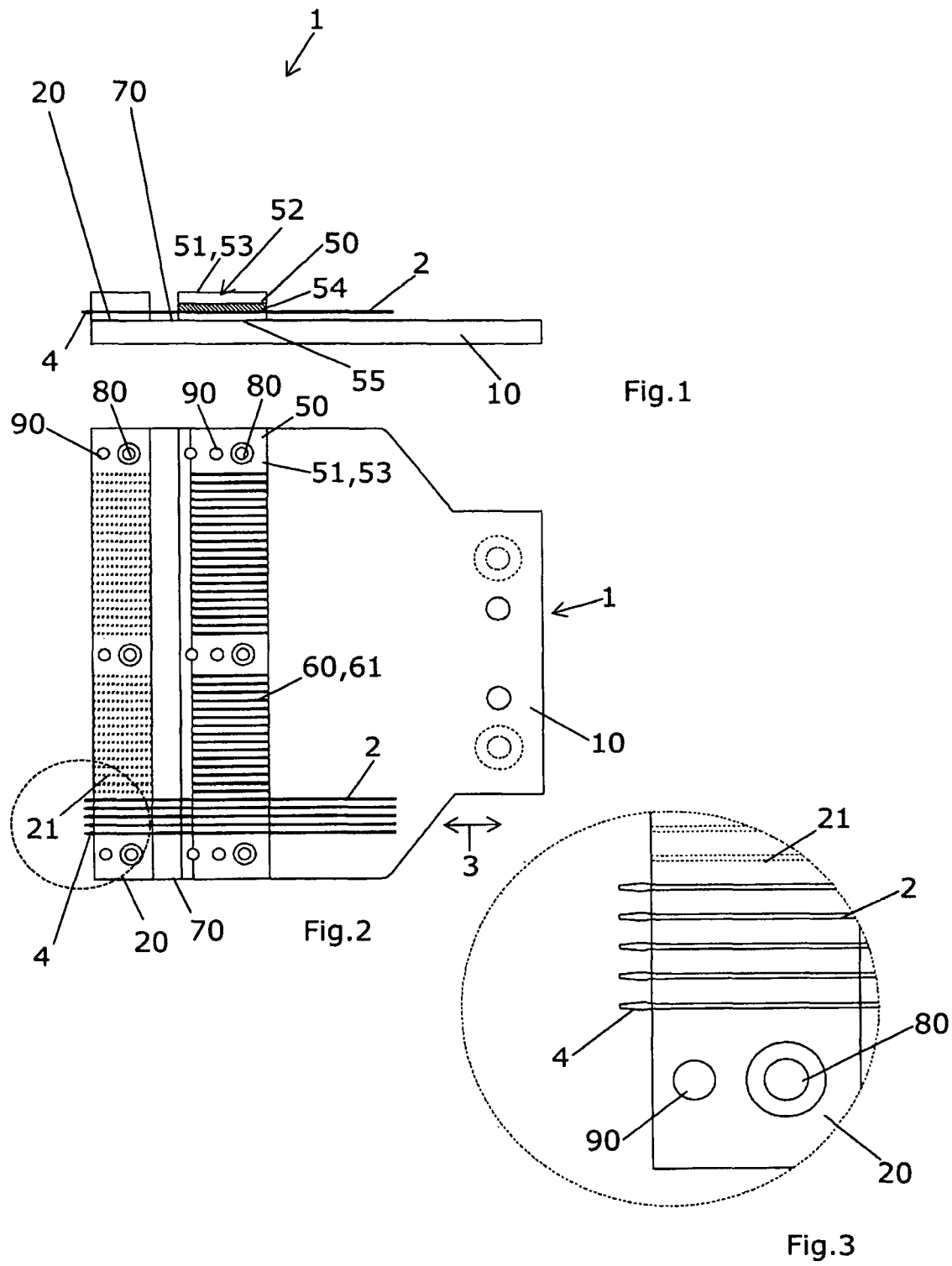

(51) Int. Cl.
*B25B 5/10* (2006.01)
*B25B 5/16* (2006.01)
*B23K 26/70* (2014.01)
*B23H 1/00* (2006.01)
*B23K 37/04* (2006.01)
*B23K 101/20* (2006.01)
*B23H 7/02* (2006.01)

(56) References Cited

U.S. PATENT DOCUMENTS

| | | | | |
|---|---|---|---|---|
| 5,499,801 | A * | 3/1996 | Nakazawa | B23D 47/04 269/157 |
| 6,119,344 | A * | 9/2000 | Court | B29C 65/7433 156/244.19 |
| 7,080,864 | B2 * | 7/2006 | Casteran | B65D 85/20 211/60.1 |
| 8,020,843 | B2 * | 9/2011 | Wang | B25B 5/10 269/266 |
| 9,561,567 | B2 * | 2/2017 | Liao | B23Q 3/061 |
| 9,833,854 | B2 * | 12/2017 | Yuzawa | B23H 7/02 |
| 9,903,656 | B2 * | 2/2018 | Guichard | C21D 9/0025 |
| 2015/0000109 | A1 * | 1/2015 | Plank | B23Q 3/104 29/557 |
| 2017/0190007 | A1 * | 7/2017 | Kousens | B23Q 3/061 |
| 2018/0178336 | A1 * | 6/2018 | Gussmann | B25H 3/003 |

FOREIGN PATENT DOCUMENTS

| | | |
|---|---|---|
| CN | 103639771 A | 3/2014 |
| DE | 7910696 U1 | 7/1979 |
| DE | 3618521 C1 | 3/1987 |
| DE | 3919078 | 2/1990 |
| DE | 19739059 A1 | 3/1999 |
| DE | 112011101672 T5 | 4/2013 |
| EP | 1262266 B1 | 7/2007 |

* cited by examiner

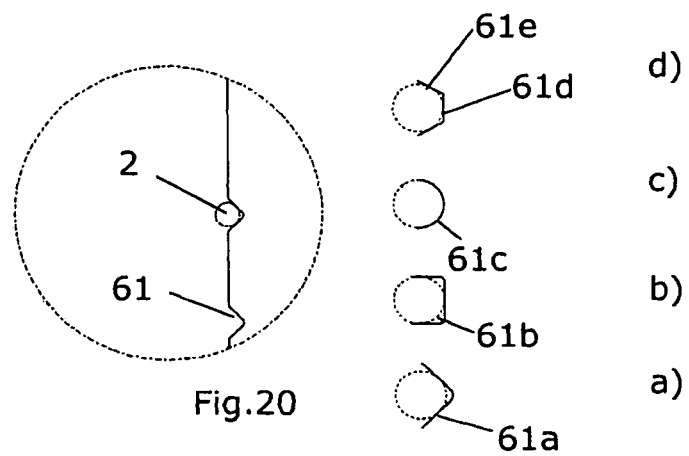
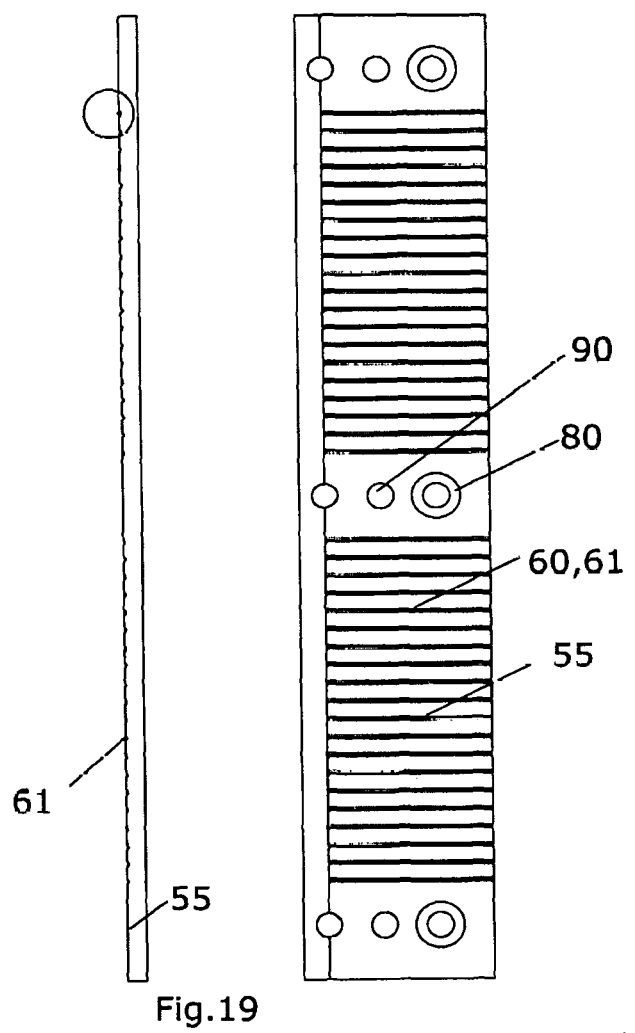
Fig.20
Fig.19
Fig.18

FIXING DEVICE, WIRE ERODING MACHINE OR LASER SYSTEM, AND WIRE ERODING OR LASING METHOD

The present invention relates to a fixing device for fixing workpieces, in particular for fixing workpieces that are substantially rod-shaped and to be machined by wire erosion or lasing. Moreover, the invention relates to a wire erosion machine or a laser system which has a fixing device according to the invention. The present invention is supplemented by a method for wire eroding or lasing a plurality of workpieces.

Various methods are known for shaping, or respectively machining workpieces in a miniature format, wherein these methods are normally performed so that minute shaped elements are produced with very high precision in terms of their dimensions, tolerances and positions. One of these methods is wire erosion, or respectively electroerosion. This is a shaping production method by means of which electrically conductive materials can be machined with great precision using the principle of spark erosion. A sequence of electrical voltage pulses takes place that generate sparks which in turn transfer material from the workpiece that is formed as an anode to a continuous, thin wire which is formed in this case as a cathode, and into a separating medium which is formed in this case by a dielectric. The great precision is achieved in that the spark removing the material always jumps across at the location of the smallest distance between the workpiece and wire.

The machining of precision parts is, however, increasingly being performed by means of lasers.

In order to ensure the precise shaping and required dimensional accuracy that is possible from wire erosion, or respectively lasing, the workpieces to be machined are fixed securely in their respective machining positions.

Various devices are known for this purpose.

A clamping block is known from DE 79 10 696 U that has a cuboid main body as well as V-blocks arranged parallel on opposite sides. These V-blocks serve to accommodate workpieces. Furthermore, the clamping block comprises one or more clamps through which clamping screws are guided in order to fix the workpieces accommodated in the V-blocks.

In DE 11 2011 101 672 T5, a workpiece holder and a wire electroerosion device are known that, in one embodiment, provides for simultaneously positioning and fixing a plurality of workpieces in a block-like seat. The fixation of the workpieces is accomplished by respective clamping apparatuses assigned to the individual workpieces. Given the simultaneous accommodation and fixation of a plurality of workpieces, a plurality of workpieces can accordingly also be simultaneously machined by means of wire electroerosion.

DE 3 618 521 C1 teaches a device for clamping non-rotating workpieces that at least sectionally possess a polygonal cross-section. The device furthermore comprises a clamping body with a clamp for accommodating the polygonal section, and a clamping means in the form of a grub screw for fixing the workpiece. The clamping means can also be supplemented with spring elements that also exert pressure force on the workpiece to be clamped.

EP 1 262 266 B1 teaches a clamping device for accommodating and fixing threaded shafts against rotation, in particular for electroeroding the respective thread. In so doing, the workpiece is fixed on its circumference by a clamping device.

A retaining plate for a workpiece is known from DE 1973 90 59 A1 that makes it possible to position and fix a workpiece within a working area of a machine, in particular an electroerosion machine, by positioning and fixing the retaining plate at a relatively large distance from a worktable. A repeatable, exact positioning of the workpiece in the work area is thereby ensured.

A disadvantage with the known devices for fixing the workpieces in the wire erosion method is that they normally do not allow the machining of minute components given the relatively high device tolerances. For example, microsurgery instruments cannot be positioned with the known devices with precision great enough for these instruments to be producible with the necessary precision, or respectively the necessary tolerances.

Moreover, the known devices are restricted with regard to flexibility in terms of accommodating different workpieces. Furthermore, it is relatively involved to fix the workpieces, or respectively supply the fixed workpieces to the machining process. In addition with the known devices, damage to the workpieces from fixing forces that are only relatively roughly adjustable cannot be excluded.

The object of the present invention is therefore to provide a fixing device and a wire erosion machine, or respectively a laser system, and a method for wire erosion, or respectively lasing or so called lasering, by means of which economical clamping, or respectively fixing, a plurality of workpieces for wire eroding or lasing said workpieces is possible in mass production with a high positional accuracy of the workpieces.

This object is achieved by the fixing device according to the invention according to claim 1, by the wire erosion machine or laser system according to the invention according to claim 9, and by the method according to the invention for wire erosion, or respectively lasing a plurality of workpieces according to claim 10. Advantageous embodiments of the fixing device according to the invention are specified in dependent claims 2 to 8.

The fixing device according to the invention serves to fix workpieces, in particular to fix substantially rod-shaped workpieces and workpieces to be machined by wire erosion or lasing or lasering. The fixing device comprises a support apparatus with a plurality of shaped elements for accommodating and supporting a plurality of workpieces in the correspondingly formed shaped elements, and for positioning and fixing the workpieces in at least one translatory degree of freedom in the shaped elements. Moreover, the fixing device according to the invention has a clamping apparatus by means of which pressure force can be applied to a plurality of workpieces accommodated in the shaped elements so that the workpieces are fixed in the clamping apparatus at least in a friction lock due to the applied pressure force. For this purpose, the support apparatus comprises a plurality of passages as shaped elements through which the workpieces can be guided, or the support apparatus comprises a plurality of first channel-shaped elements as the shaped elements in which the workpieces can be accommodated, whereby the workpieces are blocked in their translatory degrees of freedom which are oriented perpendicular to the directions of longitudinal extension of the workpieces, or respectively also to the directions of longitudinal extension of the shaped elements.

The plurality of workpieces are accommodated and supported in the shaped elements of the support apparatus such that the workpieces are accommodated in the shaped elements. Small tolerances between the shaped elements of the support apparatus and the workpieces cause the workpieces to be fixed perpendicular to their directions of longitudinal extension. At least one translatory degree of freedom that runs perpendicular to the longitudinal extension of the workpieces is thereby blocked. Preferably, both translatory degrees of freedom running perpendicular to the longitudinal extension of the respective workpiece are blocked. Together with the shaped elements of the support apparatus, the clamping apparatus ensures that the workpiece is fixed in all degrees of freedom, i.e., by the generation of friction between the workpieces and the clamping apparatus that is generated by pressure force applied by the clamping apparatus to the workpieces. That is, preferably only one support apparatus and one clamping apparatus are needed to fix a plurality of workpieces substantially at the same time by respectively applying pressure force so that these workpieces can be machined in a fixed state. The effort of serially clamping, or respectively fixing a plurality of workpieces is thereby obviated that normally arises with the previously known devices. Instead, there is simultaneous clamping and fixation of the workpieces such that these workpieces only have to be supplied to the respective machining process by moving the fixing device. This means that to supply a respective clamped and hence fixed workpiece to the machining process, only a positioning movement of the fixing device is required as well as a fixation of the fixing device in the intended position in order to position and fix the respective workpiece at the machining site at which wire erosion, or respectively lasing occurs.

The required feed movement of the fixing device can be accomplished by a guide apparatus, in particular a linear apparatus, comprising the fixing device. The fixing device according to the invention is in particular suitable for fixing, or respectively positioning, rotationally symmetrical workpieces with a diameter of 0.2 to 0.4 mm. Such workpieces can for example be blanks for producing microsurgical instruments such as are used in the field of ophthalmology. The tolerances achievable by using the fixing device according to the invention are 0 to 0.1 mm in the shaped elements to be produced against the workpieces.

Preferably, the fixing device according to the invention is configured modular such that support apparatuses and clamping apparatuses are each formed by a module that can be exchanged in a relatively easy manner. This reduces the servicing effort of the fixing device according to the invention. By precisely positioning and fixing the workpieces in the fixing device, quality control is also facilitated of the workpieces to be machined that are accommodated in the fixing device.

In a first alternative, the support apparatus comprises a plurality of passages as the shaped elements through which the workpieces can be guided, wherein the workpieces then can be fixed by the clamping apparatus. These passages can in particular be through-holes which are abutted, possibly radially, by slots. However, these slots do not serve to accommodate or guide through workpieces; instead, they are only production-related in the manufacture of passages by wire erosion.

In a second alternative, the support apparatus has a plurality of first channel-shaped elements as the shaped elements in which, or respectively on which, the workpieces can be accommodated. In these first channel-shaped elements, the workpieces are thus not surrounded on all sides by the shaped elements of the support apparatus.

In both embodiments, the shaped elements should not exceed a dimensional tolerance of ±0.0015 mm with regard to the workpiece sections that are to be accommodated by the shaped elements.

The parallelism of the shaped elements relative to each other should not exceed a tolerance of ±0.0015 mm. Moreover, holes for attaching, or respectively positioning, the support apparatus on a baseplate should not exceed a spacing tolerance of ±0.005 mm relative to each other.

The support apparatus, also termed a head plate, can be manufactured from a rust-free material and possibly hardened, wherein to manufacture this support apparatus, a wire erosion method can also be used.

In one embodiment of the fixing device according to the invention, the support apparatus always has expanding regions abutting the shaped elements along their direction of longitudinal extension, wherein a respective expanding region is designed such that an end-side section of a workpiece guided in or on the shaped element can be fixed in the expanding region in a translatory degree of freedom perpendicular to the direction of longitudinal extension of the shaped element. This means that this expanding region should have a width that is at least twice as large as the width of the associated shaped element. This expanding region can for example substantially have the shape of a V-profile with a deepest point, or respectively peak, or peak region that abuts the shaped element. The expanding region serves to center an end-side section extending out of the support apparatus, or respectively the respective shaped element, that has a greater extension perpendicular to the direction of longitudinal extension of the workpiece than the region of the workpiece which is positioned in the respective shaped element. Due to the respective expanding region, a fixation of the section of the workpiece in this region perpendicular to the direction of longitudinal extension of the workpiece is ensured, even though this region of the workpiece has a greater thickness, or respectively width, in the expanding region than the remaining workpiece.

The clamping apparatus can have a pressure element and counterpressure element between which the workpieces can be clamped. The clamping is achieved by pressure force exerted by the pressure element toward the counterpressure element. In this embodiment, it is recommendable for at least one of the elements of the pressure element and counterpressure element, preferably the counterpressure element, to have a plurality of seating apparatuses that run substantially parallel to each other and serve to support the workpieces and fix them in a substantially parallel alignment. Preferably, the workpieces should be alignable precisely parallel to each other. A tolerance of ±0.01 mm is acceptable.

The seating apparatuses can be formed by channel-shaped elements that have a V-profile, U-profile, semicircular profile or a profile with a base edge and side edges connected thereto at an obtuse angle. The workpieces are placed in the various channel-shaped elements with a linear contact. Holes to attach the counterpressure element, or respectively position the counterpressure element, should not exceed a spacing tolerance of ±0.005 mm relative to each other.

The counterpressure element, also termed a V-Block plate, can be manufactured from a rust-free material and hardened, wherein wire erosion or lasing can also be used in this case as the manufacturing method. The pressure element is also termed a cover and can be designed in a relatively simple embodiment as a plate with a soft surface such as a steel plate that is made of a rust-free material and hardened with a hard rubber layer arranged thereupon. The advantage of this rubber layer is that the workpieces are not damaged despite exertion of relatively high pressure force on the workpieces. Moreover, an impairment is not to be feared of the functioning of the pressure element, or respectively hard rubber layer, from a dielectric liquid that is required for the wire erosion process. The hard rubber layer preferably integrally bonded to the steel plate furthermore makes it possible to compensate to a certain extent for existing differences in size between the workpieces. In order to apply the needed pressure force, the pressure element can be connected by means of screw joints to the counterpressure element, or also to the baseplate, so that by establishing the screw connection, the pressure element can be moved toward the counterpressure element, and such workpieces located therebetween can be clamped. An achievable parallelism between the pressure element and counterpressure element in the closed, or respectively fixed state of the clamping apparatus should not exceed a tolerance of ±0.01 mm. The thickness of the hard rubber layer on the pressure element should be tailored to the shape and diameter of the workpieces to be fixed so that the necessary pressure force can be applied with sufficient certainty, any dimensional deviations among the workpieces can be compensated, and to simultaneously avoid damage to the workpieces.

In another advantageous embodiment, a handling region is formed between the seating apparatuses and shaped elements of the support apparatus that extends deeper than the position of the seating apparatuses parallel to the pressure force that can be applied by the pressure element. The positions of the seating apparatuses should be defined by the positions of the linear seats of the workpieces in the seating apparatuses in a direction along, or respectively parallel to, the line of action of the pressure force caused by the pressure element. Preferably, the position of the surface bordering the handling region on one side is deeper than the deepest point, or respectively the deepest linear extension of the seating apparatuses, wherein in this context the depth is to be understood as parallel to the line of action of the pressure force that can be applied by the pressure element.

It is assumed that the pressure force is applied by the pressure element toward the counterpressure element, wherein the line of action of this pressure force extends substantially perpendicular from the flat pressure element to the flat counterpressure element. Any forces acting radially on the workpiece shafts from the arrangement of the rubber layer should remain unconsidered in the description of the invention.

A surface bordering the handling region is hence arranged behind the seating apparatuses, or respectively deeper than them, so that a distance exists between the workpieces and the surface region when workpieces are accommodated in the fixing device. This surface can for example be designed oblique so that a process of threading into the shaped elements and/or the seating elements is facilitated. In general, the handling region serves to simplify a manually or automatically executed gripping of the workpieces in order to be able to remove them from the seating apparatuses even if a workpiece should perhaps become jammed in the seating apparatus from the previous application of pressure force.

The support apparatus as well as the clamping apparatus are preferably designed as modules and are fixed on a baseplate. This baseplate as well can be made of a rust-free material and hardened. The maximum parallelism of the baseplate in the regions of the connections of the support apparatus and clamping apparatus is preferably ±0.01 mm. Likewise, positioning holes are to be designed with a maximum tolerance of ±0.005 mm. The baseplate is preferably designed compactly to give the entire fixing device a light weight and accordingly design the fixing device easier to handle manually, or respectively automatically.

The device according to the invention can also be termed a clamping gauge by means of which a plurality of equivalent workpieces can be held during a wire erosion or lasing process and for subsequent measurement. With the assistance of the fixing device according to the invention, the workpieces can be spaced parallel to each other preferably with a maximum tolerance of ±0.002 mm. The workpieces can thereby be fixed stably during the entire wire erosion or lasing process. A modular design of the fixing device makes it possible to exchange individual apparatuses in an easy and flexible manner such as the support apparatus, or respectively the clamping apparatus, in order to adapt the entire fixing device to different workpieces, or respectively different workpiece dimensions.

Another aspect according to the invention is a wire erosion machine or a laser system which has a fixing device according to the invention. The fixing device can be an integral component of the wire erosion machine, or respectively the laser system, or also have an additional unit adapted to a machining unit of the wire erosion machine, or respectively laser system. The fixing device is arranged, and the machine is designed, such that they can supply the workpieces fixed in the fixing device with a feed unit to a machining region of the machine with sufficient positional accuracy.

The invention is supplemented with a method for wire eroding or lasing (lasering) a plurality of workpieces, in particular forceps or scissors, in which a plurality of workpieces are provided, a fixing device according to the invention is provided, the workpieces are fixed in the fixing device at least in a friction lock, and then the workpieces are individually wire eroded or respectively lasered sequentially, or alternatively, a plurality of workpieces are simultaneously wire eroded, or respectively lasered. The number of wire-eroded, or respectively lasered workpieces depends on how the wire is run with respect to the fixing device, i.e., simultaneously through a plurality of workpieces, or only through one workpiece.

Preferably during wire erosion, the workpieces should be machined with a fine wire, i.e., with a wire diameter of 0.02 mm to 0.07 mm. Various contours such as slots, teeth, etc. can be generated, wherein the dimensional tolerance of the generated eroded contour should not exceed ±0.02 mm.

Another aspect of the method relates to a measurement of the workpieces, or respectively manufactured workpiece contours or dimensions, after wire erosion, or respectively lasing, when the workpieces are still accommodated and locked in the fixing device. This allows a fast quality control of a plurality of workpieces to be easily realized.

The invention will be explained below with reference to the exemplary embodiments depicted in the accompanying drawings.

In the figures

Figure 4:
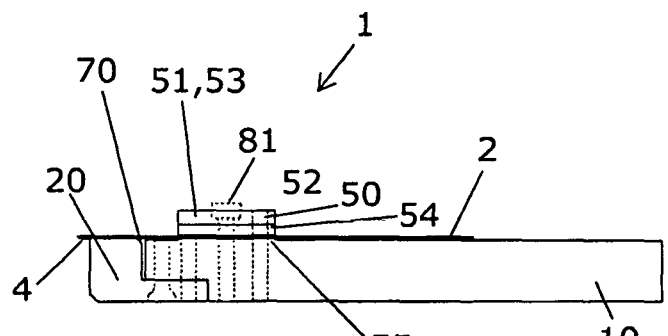
Figure 5:
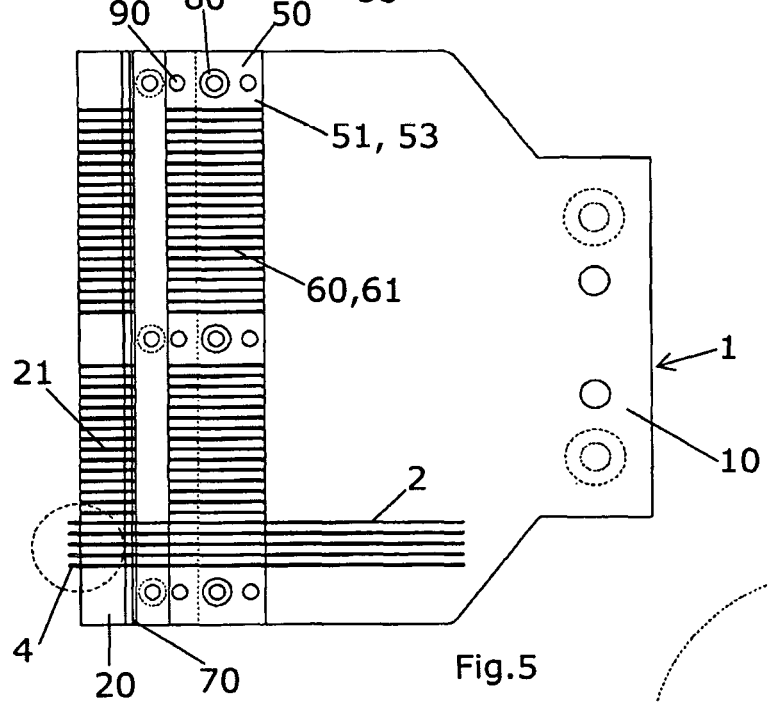
Figure 6:
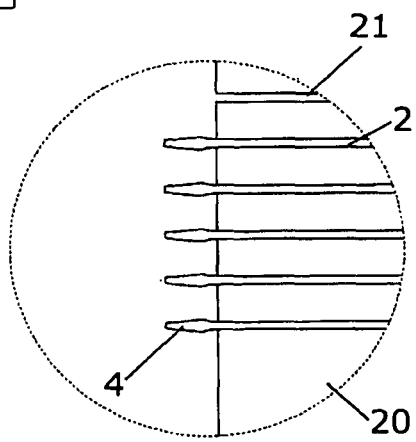
Figure 8:
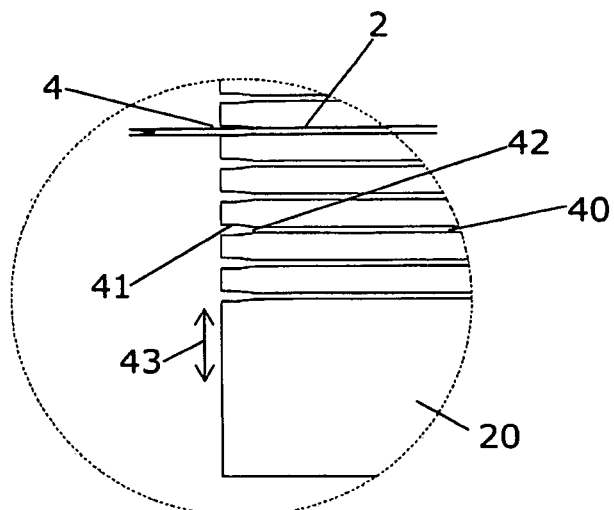
Figure 7:
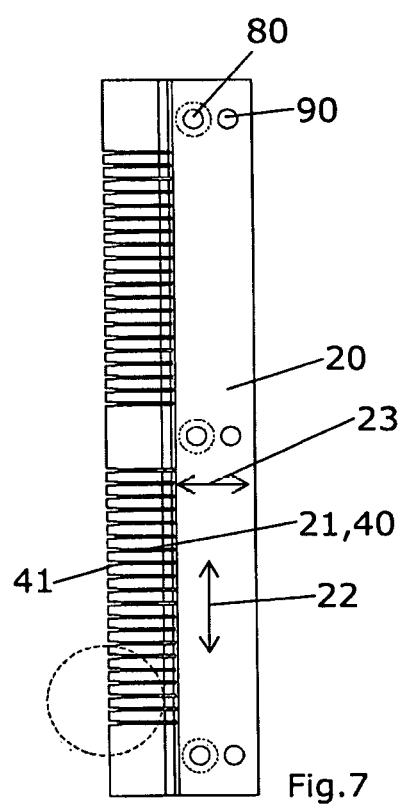
Figure 10:
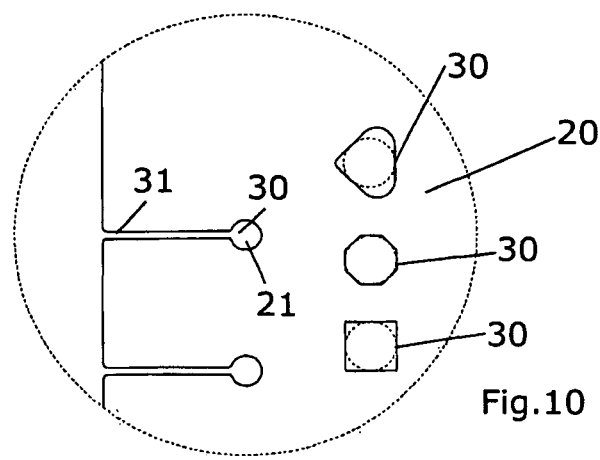
Figure 9:
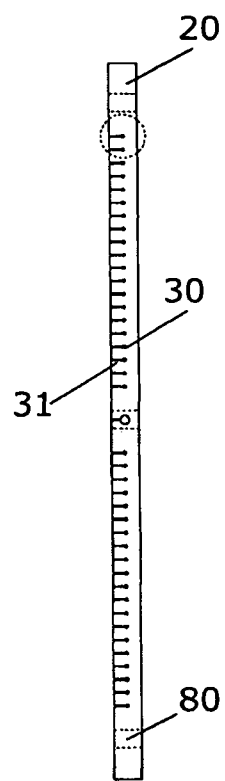
Figure 12:
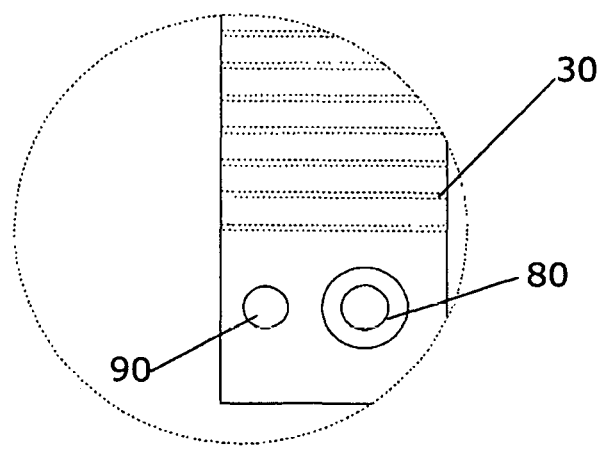
Figure 11:
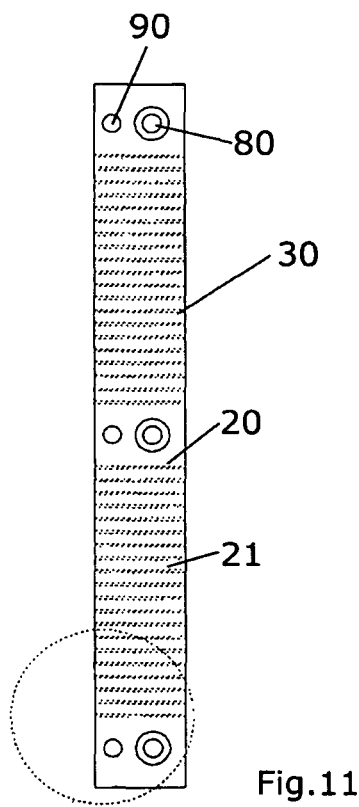
Figure 14:
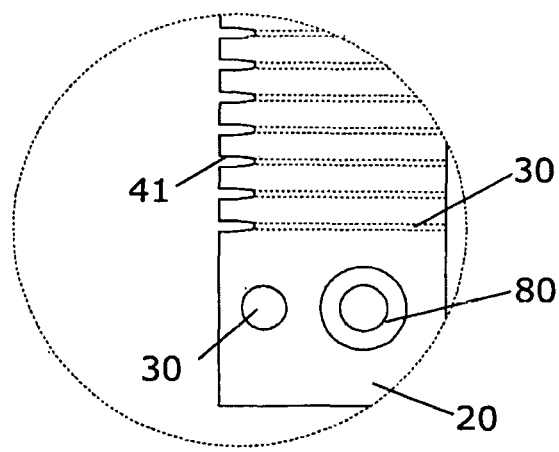
Figure 13:
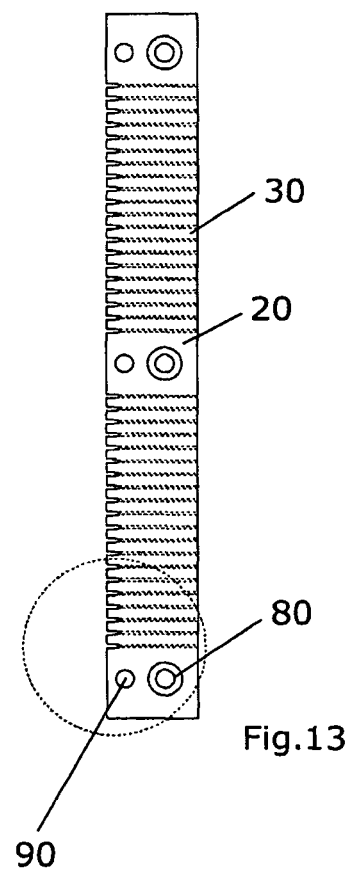
Figure 16:
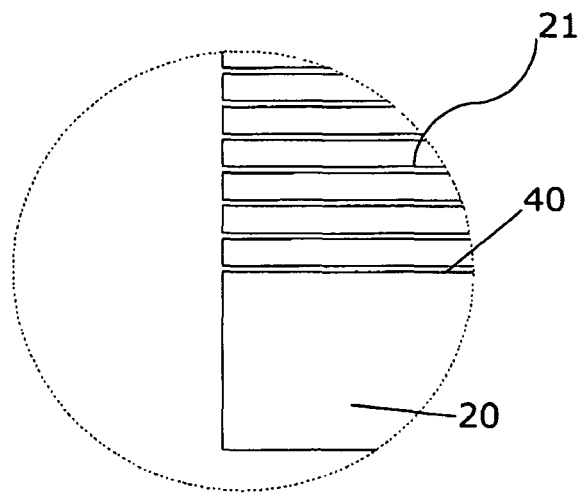
Figure 15:
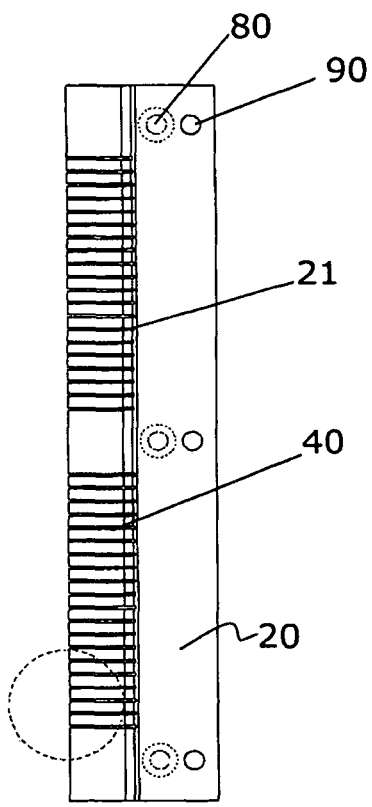
Figure 17:
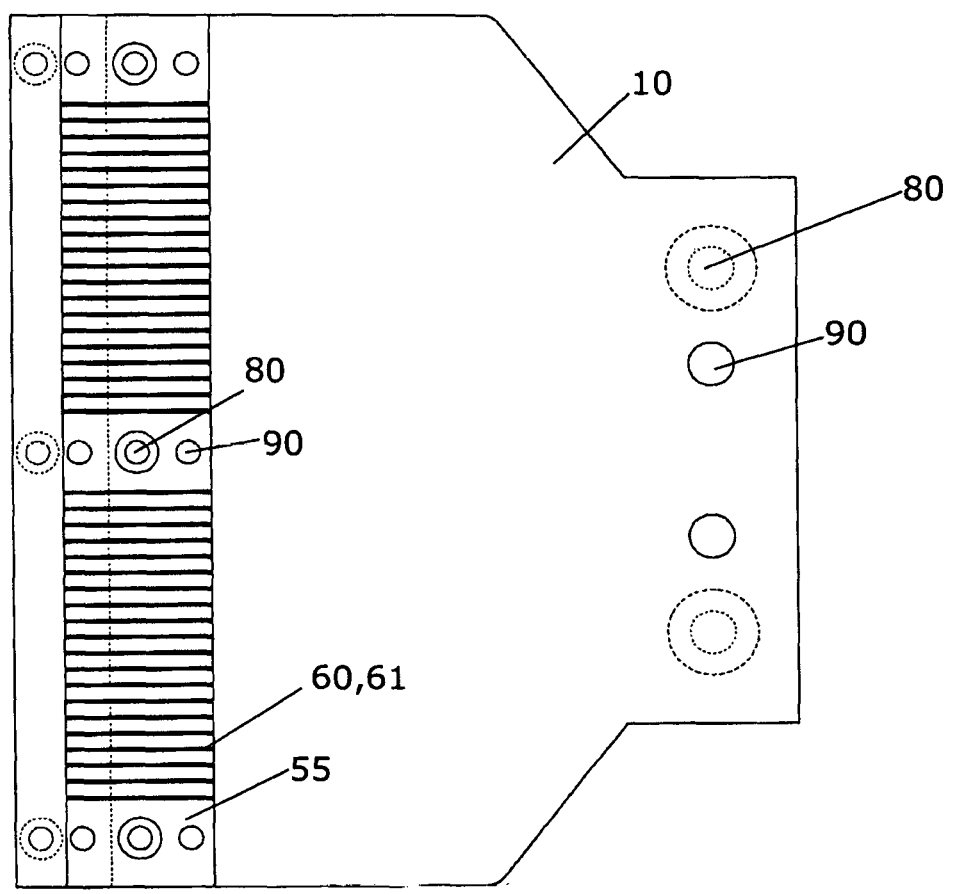

FIG. 1: shows a fixing device according to the invention of a first embodiment in a view from the side, FIG. 2: shows the fixing device of the first embodiment in a view from above, FIG. 3: shows the section indicated in FIG. 2 in an enlarged view, FIG. 4: shows a fixing device according to the invention of a second embodiment in a view from the side, FIG. 5: shows the fixing device of the second embodiment in a view from above, FIG. 6: shows the detail indicated in FIG. 5 in an enlarged view, FIG. 7: shows a support apparatus in a first embodiment in a view from above, FIG. 8: shows the detail depicted in FIG. 7 in an enlarged view, FIG. 9: shows a support apparatus of a second embodiment in a view from above, FIG. 10: shows the detail indicated in FIG. 9 in an enlarged view, FIG. 11: shows a support apparatus of a third embodiment in a view from above, FIG. 12: shows the detail indicated in FIG. 11 in an enlarged view, FIG. 13: shows a support apparatus of a fourth embodiment in a view from above, FIG. 14: shows the detail indicated in FIG. 13 in an enlarged view, FIG. 15: shows a support apparatus of a fifth embodiment in a view from above, FIG. 16: shows the detail indicated in FIG. 15 in an enlarged view, FIG. 17: shows a baseplate in a plan view with a counterpressure element arranged thereupon, FIG. 18: shows a plan view of a counterpressure element, FIG. 19: shows the counterpressure element depicted in FIG. 18 in a view from the side, FIG. 20: shows the detail indicated in FIG. 19 in an enlarged view with individual embodiments of the formed seating apparatuses.

Reference is made to FIG. 1-3 for explanation of the fixing device of the first embodiment. The fixing device 1 depicted here comprises a baseplate 10 on which a support apparatus 20 as well as a clamping apparatus 50 are arranged for supporting, or respectively clamping and thereby fixing, a plurality of workpieces 2. These workpieces 2 are formed and depicted as elongated elements with directions of longitudinal extension 3 that run substantially perpendicular to the directions of longitudinal extension of the support apparatus 20 as well as the clamping apparatus 50. For attaching the fixing device 1, the fixing device can comprise a holder by means of which the fixing device can be held on a wire erosion machine or a laser system.

It is apparent that the workpieces 2 extend out of the support apparatus 20 with end-side sections 4 in the state of being accommodated in the fixing device 1. This is in particular discernible in FIG. 3 in which the detail indicated in FIG. 2 is depicted enlarged. The support apparatus 20 as well as the clamping apparatus 50 are connected by screw joints to the baseplate 10, wherein the screw connection holes 80 are discernible here, as well as pinholes 90 arranged adjacent thereto that serve to introduce pins for exactly positioning the support apparatus 20 and clamping apparatus 50 relative to each other.

A fixing device 1 according to the invention of a second embodiment can be seen in FIG. 4-6. In this case as well, there is a baseplate 10 that can be connected to a holder (not shown here). A support apparatus 20 extends substantially within the plane of the baseplate 10. This support apparatus 20 is connected by means of screw connections to the baseplate 10. The baseplate 10 simultaneously forms a counterpressure element 55 of a clamping apparatus 50.

Just like the first embodiment of the fixing device 1 according to the invention depicted in FIG. 1-3, shaped elements 21 of the support apparatus 20 are arranged and aligned flush with the respective seating apparatuses 60 in the counterpressure element 55 of the clamping apparatus 50 in this second embodiment of the fixing device 1 according to the invention depicted in FIG. 4-6.

The workpieces 2 are positioned by the elongated shaped elements 21 of the support apparatus 20 and run in seating apparatuses 60, formed as second channel-shaped elements 61, of the clamping apparatus 50, or respectively in their counterpressure element 55.

As can be seen in FIGS. 1 and 4, a respective clamping apparatus 50 has a pressure element 51, also termed a cover, which can be pressed with a screw 81 depicted in FIG. 4, of which there can of course be many, toward the counterpressure element 55 located underneath. The depicted pressure force 52 can be thereby applied to the workpieces 2 arranged therebetween. This pressure force causes enough friction between the pressure element 51 and the workpieces 2, or respectively the counterpressure element 55 and the workpieces 2, to fix them in their position in all degrees of freedom. The pressure element 51 which is also termed a cover can have a steel plate 53, on the bottom side of which a hard rubber layer 54 is arranged that in turn comes into contact with the workpieces 2 to be fixed.

In particular in FIG. 1, a handling region 70 can be seen that is formed by a free area which is delimited on the one hand by the baseplate 10 and by the workpieces 2 opposite thereto, and on the side by the support apparatus 20 as well as the counterpressure element 55.

This handling region 70 accordingly extends in a direction that runs parallel to the line of action of the pressure force 52 behind the workpieces 2, viewed from the pressure element 51. This handling region 70 makes it possible to easily grip behind, or respectively under the workpieces 2 and accordingly facilitates a removal of the workpieces 2 from the clamping apparatus when it is open.

Various embodiments of support apparatuses 20 are depicted in FIGS. 7 to 16.

A support apparatus 20 can be seen in FIGS. 7 and 8 that, as shaped elements 21 accommodating workpieces 2, has first channel-shaped elements 40 that are arranged parallel to each other. The workpieces 2 can be inserted in these first channel-shaped elements 40. The workpieces are thereby blocked in their translatory degrees of freedom 22 that are oriented perpendicular to the directions of longitudinal extension 3 of the workpieces 2, or respectively the directions of longitudinal extension 23 of the shaped elements as well. Expanding regions 41 abut the first channel-shaped elements 40 in their directions of longitudinal extension that have a greater width perpendicular to the direction of longitudinal extension of the shaped element 23 than the first channel-shaped elements 40. This ensures that the end-side sections 4 of the workpieces 2 can be drawn to the lowest point 42 of a respective expanding region 41, and can thus be fixed in the direction of longitudinal extension of the shaped element 23. Through an adaptation of the width of the expanding region 41 to the width of the respective end-side section 4, this end-side section 4 is also blocked in a translatory degree of freedom 43 that also runs perpendicular to the direction of longitudinal extension of the workpiece 3, or respectively perpendicular to the direction of longitudinal extension of the shaped element 23 as well.

FIGS. 9 and 10 depict a support apparatus 20 of a second embodiment, wherein it can be seen that the shaped elements 21 are not formed by channels in this instance, but rather by passages 30. A slot 31 always radially abuts such a passage 30, however, the slot is only generated for production reasons when wire-eroding the passage 30.

Individual alternatives to the shape of the cross-section of the passages 30 are depicted in FIG. 10, wherein it can be seen that such a passage 30 is not limited to a round cross-section, but rather can instead have a rectangular, polygonal, or approximately triangular cross-section as well, possibly with rounded corners. These alternative shapes of the passages 30 are only depicted to illustrate their possible shapes and are not provided in the positions depicted here.

A third embodiment of the support device 20 can be seen in FIGS. 11 and 12, wherein the support apparatus 20 depicted here also has shaped elements 21 designed as passages 30.

A fourth embodiment of the support apparatus 20 is depicted in FIGS. 13 and 14 and only differs from the support apparatus depicted in FIGS. 11 and 12 in that expanding regions 41 adjoin the passages 30 and achieve the described effect of fixing end-side sections 4 of the workpieces 2.

A fifth embodiment of a support apparatus 20 is depicted in FIGS. 15 and 16, wherein the shaped elements 21 of the support apparatus 20 here are again formed by first channel-shaped elements 40.

FIG. 17 shows a baseplate 10 with a clamping apparatus 50 arranged thereupon, of which only the counterpressure element 55 is depicted. The seating apparatuses 60 are clearly discernible in the form of the second channel-shaped elements 61 that are arranged parallel to each other. The counterpressure element 55 is also connected to the baseplate 10 by screw connections as well as pins, wherein only the screw connection holes 80 and pinholes 90 are discernible here.

FIGS. 18 to 20 show a detailed depiction of a counterpressure element 55. It can be seen that a respective second channel-shaped element 61 is formed in the surface of the counterpressure plate 55. Such a second channel-shaped element 61 can be formed as a V-profile 61a as is also depicted in FIG. 20, or as well as a U-profile 61b, a semicircular profile 61c or a profile with a base edge 61d to which side edges 61e are obtusely connected.

| Reference Number List | |
|---|---|
| Fixing device | 1 |
| Workpiece | 2 |
| Direction of longitudinal extension | 3 |
| End-side section | 4 |
| Baseplate | 10 |
| Support apparatus | 20 |
| Shaped element | 21 |
| Translatory degree of freedom | 22 |
| Direction of longitudinal extension of the shaped element | 23 |
| Passage | 30 |
| Slot | 31 |
| First channel-shaped element | 40 |
| Expanding region | 41 |
| Lowest point | 42 |
| Fixed translatory degree of freedom | 43 |
| Clamping apparatus | 50 |
| Pressure element | 51 |
| Pressure force | 52 |
| Steel plate | 53 |
| Hard rubber layer | 54 |
| Counterpressure element | 55 |
| Seating apparatus | 60 |
| Second channel-shaped element | 61 |
| V-profile | 61a |
| U-profile | 61b |
| Semicircular profile | 61c |
| Base edge | 61d |
| Side edge | 61e |
| Handling region | 70 |
| Screw connection hole | 80 |
| Pinhole | 90 |

The invention claimed is:

1. A fixing device (1) for fixing workpieces (2), to fix substantially rod-shaped workpieces and workpieces (2) to be machined by wire erosion or lasing, comprising:

a support apparatus (20) with a plurality of shaped elements (21) for accommodating and supporting a plurality of workpieces (2) in the correspondingly formed shaped elements (21), and for positioning and fixing the workpieces (2) in at least one translatory degree of freedom (22) in the shaped elements (21), wherein the fixing device (1) has a clamping apparatus (50) by means of which pressure force (52) can be applied to a plurality of workpieces (2) accommodated in the shaped elements (21) so that the workpieces (2) are fixed in the clamping apparatus (50) at least in a friction lock due to the applied pressure force, wherein the clamping apparatus (50) and support apparatus (20) are arranged side by side separated from each other at a constant distance while applying the pressure force to the workpieces; and wherein:

i) the support apparatus (20) as shaped elements (21) comprises a plurality of passages (30) through which the workpieces (2) can be guided; or ii) the support apparatus (20) comprises a plurality of first channel-shaped elements (40) as the shaped elements (21) in which the workpieces (2) can be accommodated, whereby the workpieces are blocked in their translatory degrees of freedom (22) which are oriented perpendicular to the directions of longitudinal extension (3) of the workpieces (2), or respectively also to the directions of longitudinal extension (23) of the shaped elements (21).

2. The fixing device according to claim 1, characterized in that the support apparatus (20) has expanding regions (41) abutting the shaped elements (21) along their direction of longitudinal extension (23), respectively, wherein the respective expanding region (41) is designed such that an end-side section (4) of a workpiece (2) guided in or on the shaped element (21) can be fixed in the expanding region (41) in a translatory degree of freedom (43) perpendicular to the direction of longitudinal extension (23) of the shaped element (21).

3. The fixing device according to claim 1, characterized in that the clamping apparatus (50) has a pressure element (51) and a counterpressure element (55) between which the workpieces (2) can be clamped.

4. The fixing device according to claim 3, characterized in that at least one of the elements of the pressure element (51) and counterpressure element (55) has a plurality of seating apparatuses (60) that run substantially parallel to each other and serve to support the workpieces (2) and fix them in a substantially parallel alignment.

5. The fixing device according to claim 4, characterized in that the seating apparatuses (60) are formed by second channel-shaped elements (61) that have a V-profile (61a), U-profile (61b), semicircular profile (61c) or a profile with a base edge (61d) and side edges (61e) connected thereto at an obtuse angle.

6. The fixing device according to claim 4, characterized in that a handling region (70) is formed between the seating apparatuses (60) and shaped elements (21) of the support apparatus (20) that extends deeper than the position of the seating apparatuses (60) parallel to the pressure force (52) that can be applied by the pressure element (51).

7. A laser system comprising a fixing device (1) according to claim 1.

8. A method for wire eroding or lasing a plurality of workpieces (2), in which a plurality of workpieces (2) are provided, a fixing device (1) according to claim 1 is provided, the workpieces (2) are fixed in the fixing device (1) at least in a friction lock, and then the workpieces (2) are individually wire eroded, or respectively machined with a laser, sequentially, or a plurality of workpieces (2) are simultaneously wire eroded or machined with a laser.

9. A wire eroding machine comprising a fixing device (1) according to claim 1.

\* \* \* \* \*